United States Patent

Lauterbach et al.

Patent Number: 6,035,118
Date of Patent: Mar. 7, 2000

[54] MECHANISM TO ELIMINATE THE PERFORMANCE PENALTY OF COMPUTED JUMP TARGETS IN A PIPELINED PROCESSOR

[75] Inventors: Gary Lauterbach, Los Altos Hills; Kit Tam, Belmont, both of Calif.

[73] Assignee: Sun Microsystems, Inc., Palo Alto, Calif.

[21] Appl. No.: 08/880,370

[22] Filed: Jun. 23, 1997

[51] Int. Cl.⁷ .................................................. G06F 9/32
[52] U.S. Cl. .............................................................. 395/580
[58] Field of Search ................................ 395/378, 383, 395/390, 580, 581, 586, 584, 800.23, 395

[56] References Cited

U.S. PATENT DOCUMENTS

| | | | |
|---|---|---|---|
| 5,313,634 | 5/1994 | Eickemeyer | 395/587 |
| 5,526,498 | 6/1996 | Matsuo et al. | 395/586 |
| 5,623,614 | 4/1997 | Van Dyke et al. | 395/587 |
| 5,706,491 | 1/1998 | McMahan | 395/581 |

OTHER PUBLICATIONS

Daniel Tabak, "The Sun Sparc," *RISC Systems,* pp. 144–161, Research Studies Press Ltd., Somerset, England and John Wiley & Sons, Inc., New York, Chichester, Toronto, Brisbane, Singapore.

*Primary Examiner*—Parshotam S. Lall
*Assistant Examiner*—Viet Vu
*Attorney, Agent, or Firm*—Townsend and Townsend and Crew LLP

[57] ABSTRACT

A technique for eliminating the performance penalty of implementing jump instructions in a deeply pipelined processor includes a pipeline having a signal for indicating that the top of the address return stack has been updated by an address moved to the return register. An instruction moving a previously computed jump target address to the return register is included in code to be executed. The pipeline uses the instruction at the top of the RAS as a guess of the target instruction of a fetched jump instruction and immediately begins fetching instructions indicated by the guess.

3 Claims, 3 Drawing Sheets

MECHANISM TO ELIMINATE THE PERFORMANCE PENALTY OF COMPUTED JUMP TARGETS IN A PIPELINED PROCESSOR

BACKGROUND OF THE INVENTION

1. Field of the Invention

The present invention relates generally to improving the efficiency of a pipelined processor by eliminating bubbles in the pipeline caused by the execution of jump instructions and more particularly relates to reducing the execution time spent dispatching to code emulation routines using jump instructions with target addresses that are not easily predictable.

2. Description of the Related Art

Threaded code interpreters, such as the Java virtual machine, execute code emulation routines to emulate byte codes in a program. The threaded code interpreter uses jump instructions with computed target addresses to dispatch control between code emulation routines.

Jump instructions with computed targets are a time consuming operation on high performance deeply pipelined processors.

A computed jump instruction executes in the EU 56 where the target instruction of the jump is calculated. In a deeply pipelined processor a jump with a computed target address will typically take >>N cycles to execute where N is the number of pipeline stages to execute. When program flow is redirected by a jump instruction N instructions in the pipeline are now invalid and thus form bubbles, i.e., stages having instructions which will not be executed, in the pipeline. If each pipeline stage executes in one clock cycle, there will be a delay of N clock cycles between the execution of the jump instruction and jump target instruction.

In threaded code interpreters, such as the Java JVM, each emulation routine is about N assembly language instructions. Thus, the delay due to bubbles in the pipeline is about equal to the time required to execute each emulation routine. Ironically, processors utilizing faster clocks utilize deeper pipelines so the performance penalty increases.

Because of the importance of Java and other threaded interpreters improved processor design is important to facilitate high speed execution of programs written in language executed on such an interpreter. Additionally, unpredictable jump targets also occur frequently in switch statement executed in "C".

SUMMARY OF THE INVENTION

According to one aspect of the present invention, the computed target address of jump instruction is computed prior to the execution of the jump instruction and communicated to the fetch stage when the jump instruction is fetched from the I$. Accordingly, the instructions of the following emulation routine are immediately fetched after the jump instruction is fetched to completely eliminate bubbles in the pipeline.

According to another aspect of the invention, performance penalties due to jump instructions executed by the JAVA interpreter are eliminated by immediately beginning to fetch instructions in a following byte code emulation routine subsequent to fetching a last instruction of a currently executing byte code emulation routine.

According to another aspect of the invention, the computed target address of the jump instruction is stored at the top of the return address stack.

According to another aspect of the invention, the byte code emulation routines are modified to include an instruction which moves the computed jump target address to the top of the return address stack.

According to another aspect of the invention, the execution unit generates a signal which enables writing to the top of the return address stack when the jump target address is moved to the top of the stack.

According to a further aspect of the invention, instruction are fetched from the address stored at the top of the return address stack subsequent to fetching a jump instruction is from the I$.

Other features and advantages of the invention will be apparent in view of the following detailed description and appended drawings.

DESCRIPTION OF THE PREFERRED EMBODIMENT

Prior to describing preferred embodiments, the operation and linking of standard byte code emulation routines will be describe with reference to a standard pipeline. The operation of the a threaded interpreter is depicted symbolically in FIG. 1.

Figure 1:
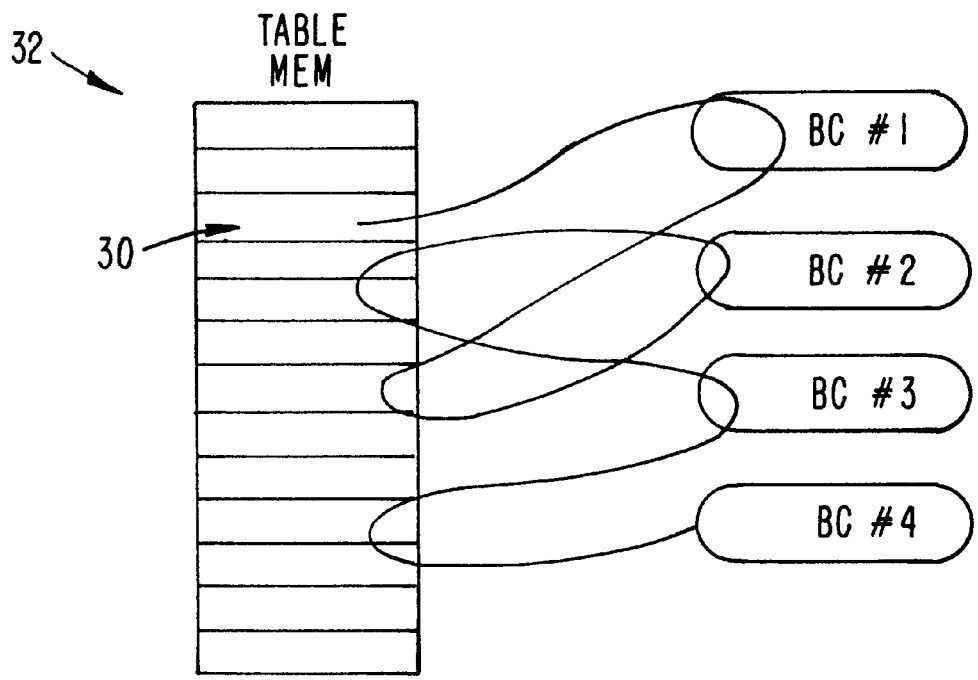
FIG. 1 is a schematic diagram of the operation of a threaded code interpreter.

Referring to FIG. 1, the byte code emulation routines are stored at storage locations 30 in a memory 32. Each byte code 34 includes an instruction for computing the address of the next byte code to be executed and ends with a jump instruction to redirect instruction fetching to the computed address of the next byte code.

The following pseudo-code illustrates the format of a typical byte code emulation routine:

| | |
|---|---|
| ldb [next_byte_code_table_entry], %r2 | //load address of //next byte code in //register %r2 as //computed jump //target address |
| add pc, %4, pc | //increment pc |
| ld[tos], %r0 | |
| ld [tos-4] | |
| add %r1, %r0, %r0 | //emulate byte code |
| st %r0 [tos] | |
| jump %r2 | //jump to computed //address of next //byte code held in //%r2 |

As depicted in FIG. 1, each byte code 34 includes a pointer to an entry in a table which stores the address of the next byte code to be executed. This address is provided to the jump instruction to redirect instruction fetching the memory location 32 storing the next byte code. The pseudo-code instruction:

ldb [next_byte_code_table_entry], %r2
computes the address of the next byte code by utilizing the pointer to load the next address from the table entry to register %r2. After the byte code emulation routine has been executed the jump %r2 pseudo-code instruction is executed to redirect instruction fetching to an instruction indicated by the computed address.

The pipeline will begin fetching instructions from the computed next byte code address when the jump instruction is executed. All previously fetched instructions in the pipeline fetched prior to the instruction at the computed next byte code address are now invalid and there will be time delay until instructions of the next byte emulation routine move through the pipeline to the EU.

Figure 2:
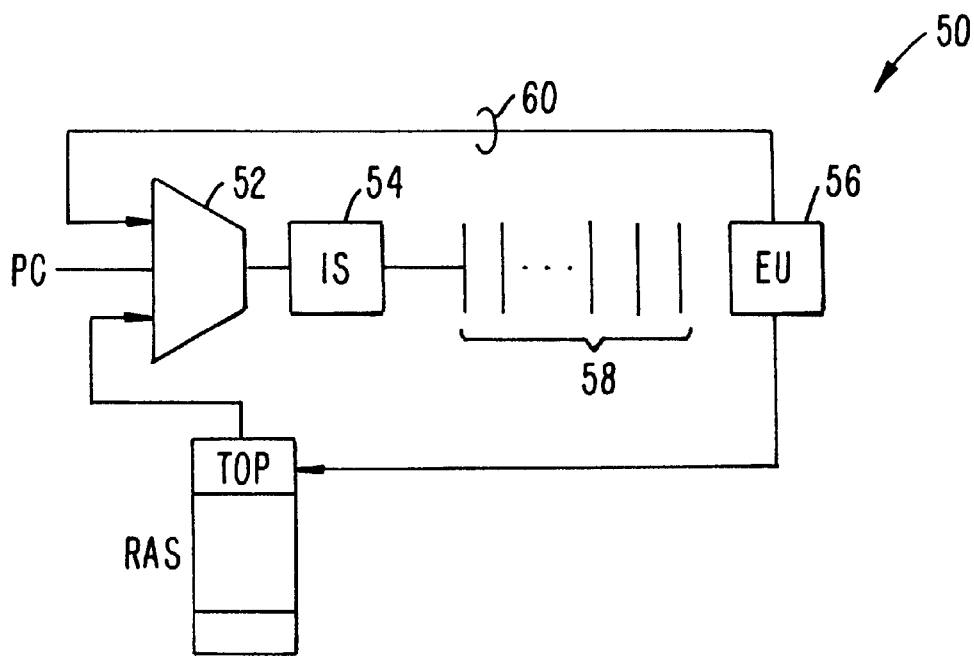
FIG. 2 is a schematic diagram of a pipeline embodying the present invention.

FIG. 2 is a schematic diagram of the improved pipeline of the present invention. Most of the elements in FIG. 2 are standard and will be described first.

FIG. 2 depicts a deep pipeline 50 including a multiplexer (MUX) 52, an instruction cache (I$) 54, and execution stage (EU) 56, and up to 9 stages 58, such as decode, address calculation, operation fetch, etc. between the I$ 52 and EU 56. An address transfer line 60, between the EU 56 and I$ 52 is used to communicate change of instruction flow addresses calculated in the EU 56. A return address stack (RAS) 62 is utilized to return to the calling program at the point where a subroutine was called upon completion of the subroutine.

The MUX 52 controllably couples either the address communicated from the EU 56 on the address transfer control line 60, the PC address, or the address stored at the top of the RAS 62 to control program flow. Thus, the MUX 52 functions as an instruction fetch stage 61 of the pipeline by providing addresses of instructions to be issued from the I$ to the pipeline.

When a jump instruction is fetched from the I$ 54 the pipeline fetch stage always uses the address stored at the top of the RAS 62 as guess of the target address for the computed jump. Of course, the actual computed jump address is not known until the jump instruction is executed in the EU 56.

In the preferred embodiment the EU 56 generates a control signal to indicate that the top of the RAS 62 has been updated by the execution of a designated instruction.

The operation of the embodiment depicted in FIG. 2 will now be described with reference to the flow chart of FIG. 3 and the following pseudo-code listing.

| | |
|---|---|
| ldb [next_byte_code_table_entry], %r2 | //load address of //next byte code in //register %r2 as //computed jump //target address |
| movr %r2, %r15 | //moves computed //jump instruction //to the top of the //RAS |
| add pc, %4, pc | //increment pc |
| ld[tos], %r0 | |
| ld [tos-4] | |
| add %r1, %r0, %r0 | //emulate byte code |

-continued

| | |
|---|---|
| st %r0 [tos] | |
| jump %r2 | //jump to computed //address of next //byte code held in //%r2 |

By way of illustration, the above pseudo-code is written for execution on processors implemented according to the SPARC V9 specification. In those processors, %r15 is utilized as the return register. Accordingly, in the above pseudo-code listing the instruction mov %r2, %r15 moves the computed target address from %r2 to %r15.

Figure 4:
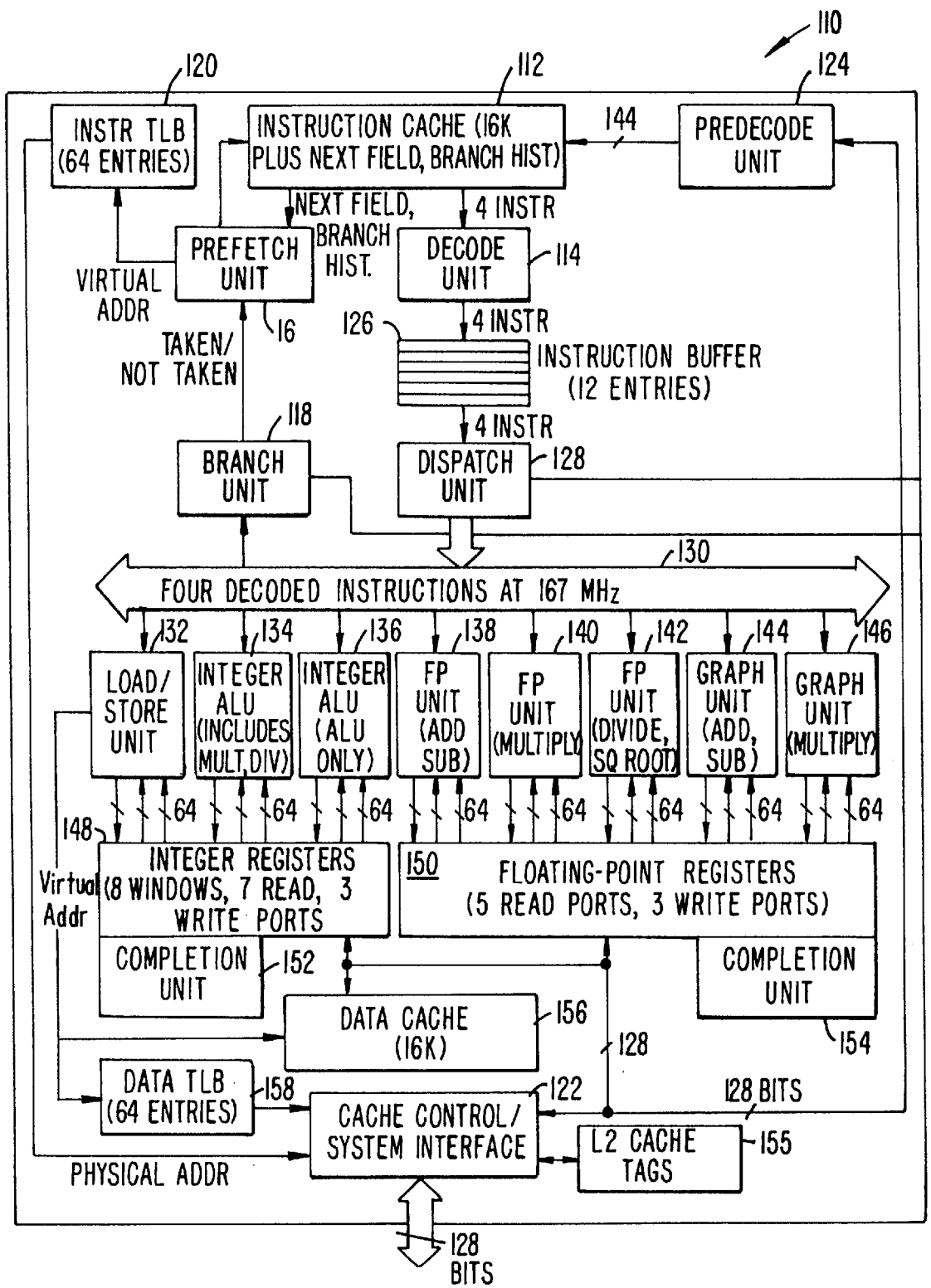
FIG. 4 is a block diagram of a processor unit for implementing the present invention.

FIG. 4 is a block diagram of a chipset implemented according to the SPARC specification including a processor 110. An instruction cache can receive its instructions from a prefetch unit 116, which either receives instructions from branch unit 118 or provides a virtual address to an instruction TLB (translation look-aside buffer) 120, which then causes the instructions to be fetched from an off-chip cache control/system interface 122. The instruction from the off-chip cache are provided to a pre-decode unit 124 to provide certain information, such as whether the instruction is a branch instruction, to instruction cache 112.

Instructions from decode unit 114 are provided to an instruction buffer 126, where the are accessed by dispatch unit 128. Dispatch unit 128 will provide four decoded instructions at a time along a bus 130, each instruction being provided to one of eight functional units 132–146. The dispatch unit 128 will dispatch four such instructions each cycle, subject to checking for data dependencies and availability of the proper functional unit.

The first three functional units, the load/store unit 132 and the two integer ALU units 134 and 136, share a set of integer registers 148. Floating-point registers 150 are shared by floating point units 138, 140, and 142 and by graphical units 144 and 146. Each integer and floating point functional unit group has a corresponding completion units, 152 and 154, respectively. The microprocessor also includes on-chip data cache 156, a data TLB 158, and optionally, an on-chip second level cache tag memory 155.

Figure 3:
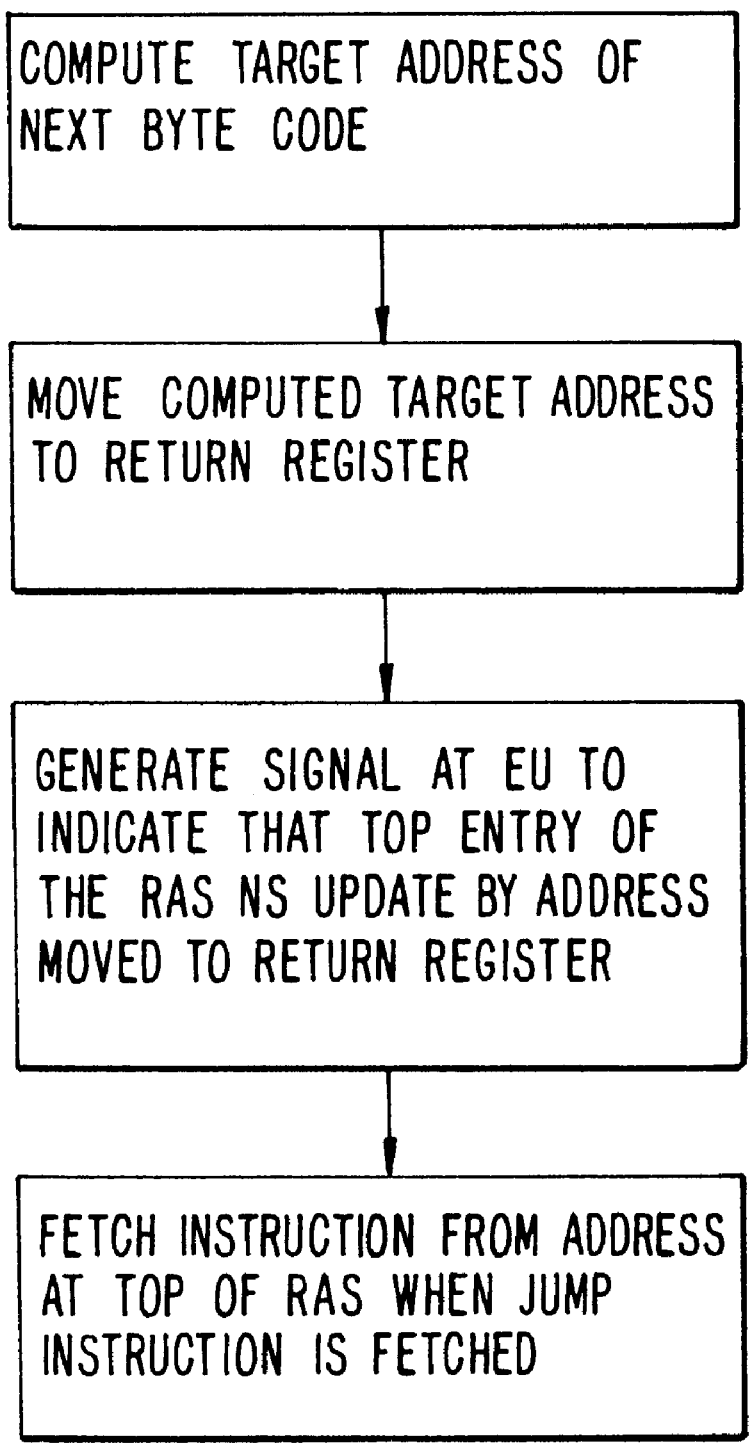
FIG. 3 is a flowchart depicting the steps implemented by an embodiment of the invention.

Referring to FIGS. 2 and 3, the computed target address is moved to the return register by the movr %r2, %r15 instruction. The EU generates a signal indicating the top entry of the RAS 62 has been updated by the instruction moved to the return register. After the jump instruction is fetched, subsequent instructions are fetched from the address held at the top of the RAS 62.

Thus, immediately after the last instruction, i.e., jump %r2, of the byte code being executed is issued the pipeline immediately begins fetching the instructions of the next byte code to be executed. When the jump instruction of the current byte code is executed to change instruction flow to the next byte code the pipeline stages all hold instructions of the next byte code emulation routine and there is no delay in beginning the execution of that routine.

Thus, by providing the pipeline with a "hint" of the location of the next byte code and enabling the pipeline to use the hint the performance penalty associated with using threaded code interpreters in a pipelined machine is eliminated.

The technique describe above is useful in any situations where jump instructions with unpredictable computed target addresses are utilized, for example in "C" switch statements. The efficacy of the technique depends on the ability to generate a hint of the correct computed target address and the ability to move the hint to the top of the RAS before the jump instruction is fetched by the pipeline.

The invention has now been described with reference to the preferred embodiments. Alternatives and substitutions will be now be apparent to persons of skill in the art. For example, the invention has been described utilizing the return register specified in the SPARC V9 specification. However, the invention can be utilized in other processors as is well understood by persons of skill in the art. Accordingly, it is not intended to limit the invention except as provided by the appended claims.

What is claimed is:

1. A system for reducing the time delay associated with executing a computed jump instruction in a pipelined microprocessor, where the computed jump instruction redirects instruction fetching to a computed target instruction address computed by a target instruction address computation instruction executed prior to the computed jump instruction, and where the computed target instruction address, calculated by the target address calculation instruction, is stored in an addressable storage location, said system comprising:

a return address stack, having a top location for holding a return address;

an execution pipeline having a plurality of stages including:

an instruction cache for storing instructions to be fetched by an instruction execution pipeline, with the identity of an instruction stored indicated by an instruction address provided to the instruction cache;

an instruction fetch stage for fetching an instruction from said instruction cache, where the identify of an instruction to be fetched is indicated by an instruction address provided to said instruction cache by said instruction fetch stage, and where said instruction fetch stage always provides an address stored at the top of the return address stack to fetch a next instruction after a computed jump instruction is fetched; and an execution unit for executing said instruction address computation instruction to compute a computed target instruction address and store the computed target instruction address in the first addressable storage location, with the execution unit for executing a designated instruction for moving said computed target instruction address from the first addressable storage location to the to the top of the return address stack and to assert a signal indicating that the computed target instruction address has been stored, and for subsequently executing a computed jump instruction to redirect program execution as indicated by said computed target instruction address stored at the top of the return address stack, so that bubbles in the pipeline subsequent to the computed jump instruction are eliminated.

2. An improved system for executing programs interpreted by a JAVA threaded code interpreter comprising:

a computer usable medium having computer readable code embodied therein including a program for interpretation by the JAVA threaded code interpreter, said program comprising byte codes including computer readable code devices configured to effect moving a computed jump target address to a return register implemented in a pipeline;

a return address stack, having a top location for holding a return address;

an execution pipeline having a plurality of stages including:

an instruction cache for storing instructions to be fetched by an instruction execution pipeline, with the identity of an instruction stored indicated by an instruction address provided to the instruction cache;

an instruction fetch stage for fetching an instruction from said instruction cache, where the identify of an instruction to be fetched is indicated by an instruction address provided to said instruction cache by said instruction fetch stage, and where said instruction fetch stage always provides an address stored at the top of the return address stack to fetch a next instruction after a computed jump instruction is fetched; and an execution unit for executing said instruction address computation instruction to compute a computed target instruction address and store the computed target instruction address in the first addressable storage location, with the execution unit for executing a designated instruction for moving said computed target instruction address from the first addressable storage location to the to the top of the return address stack and to assert a signal indicating that the computed target instruction address has been stored, and for subsequently executing a computed jump instruction to redirect program execution as indicated by said computed target instruction address stored at the top of the return address stack, so that bubbles in the pipeline subsequent to the computed jump instruction are eliminated.

3. A method for reducing the time delay associated with executing a computed jump instruction in a pipelined microprocessor, where the computed jump instruction redirects instruction fetching to a computed target instruction address computed by a target instruction address computation instruction executed prior to the computed jump instruction, and where the computed instruction address, calculated by the target address calculation instruction, is stored in an addressable storage location, with said method performed in a processing system having a return address stack, having a top location for holding a return address, an execution pipeline having an instruction cache for storing instructions to be fetched by an instruction execution pipeline, with the identity of an instruction to be issued indicated by an instruction address provided to the instruction cache, said method comprising the steps of:

fetching an instruction from said instruction cache, where the identify of an instruction to be fetched is indicated by an instruction address provided to said instruction cache by said instruction fetch stage, and where said instruction fetch stage always provides an address stored at the top of the return address stack to fetch a next instruction after a computed jump instruction is fetched;

computing a computed target instruction address and storing the computed target instruction address in the first addressable storage location;

moving said computed target instruction address from the first addressable storage location to the to the top of the return address stack and asserting a signal indicating that the computed target instruction address has been stored;

subsequently executing a computed jump instruction to redirect program execution as indicated by said computed target instruction address stored at the top of the return address stack, so that bubbles in the pipeline subsequent to the computed jump instruction are eliminated.

* * * * *

UNITED STATES PATENT AND TRADEMARK OFFICE
CERTIFICATE OF CORRECTION

PATENT NO. : 6,035,118
DATED : Mar. 7, 2000
INVENTOR(S) : Gary Lauterbach and Kit Tam It is certified that error appears in the above-indentified patent and that said Letters Patent is hereby corrected as shown below:

In column 6 at line 6, delete "identify" and insert therefor --identity--.
In column 6 at line 46, delete "identify" and insert therefor --identity--.

Signed and Sealed this

Third Day of April, 2001

*Attest:*

NICHOLAS P. GODICI

*Attesting Officer*  *Acting Director of the United States Patent and Trademark Office*